United States Patent
Abdollahi et al.

(10) Patent No.: US 7,058,054 B2
(45) Date of Patent: Jun. 6, 2006

(54) CONTROLLING MULTIPLE NODES TO EXECUTE MESSAGES ONLY ONCE

(75) Inventors: Mahshid Ellie Abdollahi, Los Altos Hills, CA (US); Sanjay Bhatia, Campbell, CA (US); Javad M. Esmaeili, Sunnyvale, CA (US)

(73) Assignee: SkyStream Networks Inc., Sunnyvale, CA (US)

(*) Notice: Subject to any disclaimer, the term of this patent is extended or adjusted under 35 U.S.C. 154(b) by 862 days.

(21) Appl. No.: 09/933,265

(22) Filed: Aug. 20, 2001

(65) Prior Publication Data

US 2003/0035425 A1 Feb. 20, 2003

(51) Int. Cl.
*H04L 12/56* (2006.01)

(52) U.S. Cl. .................................. 370/392; 370/395.2
(58) Field of Classification Search ................ 370/389, 370/260, 261, 262, 461, 462, 351, 352, 229, 370/401, 402, 403; 709/251, 252, 253, 216, 709/217, 221, 219, 238, 240, 241
See application file for complete search history.

(56) References Cited

U.S. PATENT DOCUMENTS 5,802,287 A * 9/1998 Rostoker et al. ......... 370/395.5
6,401,117 B1   6/2002 Narad et al.
6,882,634 B1 * 4/2005 Bagchi et al. ............ 370/338

OTHER PUBLICATIONS

International Search Report dated Jan. 3, 2003 of International Application No. PCT/US02/26001 (3 pages).

* cited by examiner

*Primary Examiner*—Dang Ton
(74) *Attorney, Agent, or Firm*—Proskauer Rose LLP

(57) ABSTRACT

A broadcast satellite network transmits from a source to multiple router nodes digital real-time program information and best-effort data. The router nodes are specifically suited for extracting best-effort data streams from the multiplexed signal received via, e.g., a satellite. A number of management techniques are disclosed. According to one technique, a packet is formed having a network layer header, including a destination address for routing a packet to a destination, a second header identifying a syntax and semantic by which a payload of the packet may be parsed in a predefined fashion, and a payload containing a command to be executed by each of one or more to-be-managed nodes to which the packet is destined. The packet is transmitted a plural amount of times to a plurality of nodes, including the one or more to-be-managed nodes, but the command in the particular packet is executed only a single time. According to other techniques, the nodes are divided into groups. In one technique, a unique identifier is assigned to each group and the packet containing the command contains the identifier. The packet is transmitted once but received by all nodes, including the group of nodes to which the same identifier was assigned. Only those nodes of the group with the same identifier execute the command. According to anther embodiment, a manager node maintains a list of the addresses of all nodes in a group and automatically transmits the packet once to each address, thereby enabling automatic communication of the same packet to multiple nodes.

23 Claims, 5 Drawing Sheets

CONTROLLING MULTIPLE NODES TO EXECUTE MESSAGES ONLY ONCE

RELATED APPLICATIONS

The subject matter of this application is related to the subject matter of the following patent applications, all of which are commonly assigned to the same assignee as is this application:

(1) U.S. patent application Ser. No. 09/007,212, entitled "Receipt and Dispatch Timing of Transport Packets in a Video Program Bearing Stream Remultiplexer," filed on Jan. 14, 1998 for Regis Gratacap and William Slattery, now issued as U.S. Pat. No. 6,292,490;

(2) U.S. patent application Ser. No. 09/007,334, entitled "Dynamic Video Program Bearing Stream Remultiplexer," filed on Jan. 14, 1998 for Regis Gratacap, now abandoned;

(3) U.S. patent application Ser. No. 09/007,203, entitled "Re-timing of Video Program Bearing Streams Transmitted by an Asynchronous Communication Link," filed on Jan. 14, 1998 for Regis Gratacap, now issued as U.S. Pat. No. 6,195,368;

(4) U.S. patent application Ser. No. 09/007,211, entitled "Bandwidth Optimization of Video Program Bearing Transport Streams," filed on Jan. 14, 1998 for Robert Robinett and Regis Gratacap, now issued as U.S. Pat. No. 6,351,471;

(5) U.S. patent application Ser. No. 09/007,210, entitled "Network Distributed Remultiplexer for Video Program Bearing Transport Streams," filed on Jan. 14, 1998 for Robert Robinett, Regis Gratacap and William Slattery, now issued as U.S. Pat. No. 6,351,474;

(6) U.S. patent application Ser. No. 09/007,204, entitled "Remultiplexer for Video Program Bearing Transport Streams with Assisted Output Timing for Asynchronous Communication Output," filed on Jan. 14, 1998 for Regis Gratacap;

(7) U.S. patent application Ser. No. 09/006,964, entitled "Remultiplexer for Video Program Bearing Transport Streams with Program Clock Reference Time Stamp Adjustment," filed on Jan. 14, 1998 for William Slattery and Regis Gratacap, now issued as U.S. Pat. No. 6,111,896;

(8) U.S. patent application Ser. No. 09/007,198, entitled "Remultiplexer Cache Architecture and Memory Organization for Storing Video Program Bearing Transport Packets and Descriptors," filed on Jan. 14, 1998 for William Slattery and Regis Gratacap, now issued as U.S. Pat. No. 6,064,676;

(9) U.S. patent application Ser. No. 09/007,199, entitled "Scrambling and Descrambling Control Word Control in a Remultiplexer for Video Bearing Transport Streams," filed on Jan. 14, 1998 for William Slattery and Regis Gratacap, now issued as U.S. Pat. No. 6,148,182;

(10) U.S. patent application Ser. No. 09/006,963, entitled "Reference Time Clock Locking in a Remultiplexer for Video Program Bearing Transport Streams," filed on Jan. 14, 1998 for William Slattery, now issued as U.S. Pat. No. 6,246,701; and

(11) U.S. patent application Ser. No. 09/393,227, entitled "Remultiplexer Architecture for Controlling the Supply of Data to be Combined With Constant End-to-End Delay Information," filed on Sep. 9, 1999 for John R. Mick, Jr.

The contents of these documents are fully incorporated herein by reference.

FIELD OF THE INVENTION

The present invention pertains to communication networks, such as audio-video program communication networks, that carry digital information from a source to multiple remote sites. At least one of the remote site includes manageable nodes, such as router nodes.

BACKGROUND OF THE INVENTION

Several communication networks are known which can deliver television or audio signals, such as a terrestrial broadcast network, a cable network and a satellite network. Each of these networks can also deliver digital audio-video signals. In addition, it is also possible to deliver digital audio-video signals via a telephone network, e.g., using T1 (or higher capacity lines) and so-called DSL or digital subscriber loop lines.

In each of the networks described above, the audio or audio-video signals (hereinafter, collectively, "program signal(s)") are intended to be delivered in real-time, i.e., for real-time consumption. Specifically, the program signals are delivered nominally at a rate that matches the consumption (decode and presentation) rate of the signal. Thus, if the program signal is to be displayed at 30 frames per second, the digital information representing the video is nominally delivered at the rate of 30 frames per second. However, in the case that the program signal, or a component elementary stream thereof, such as a video signal, audio signal, closed-caption text signal, etc., is variably compressed, the actual instantaneous bit rate actually fluctuates. Thus, some temporary buffering is required at the receiver/decoder end of the program signal. Such buffer space is of a limited, predetermined size and the flow of digital information through the buffer (more concretely, the time at which each piece of digital information is inputted to or removed from the buffer) is strictly controlled. Therefore, these signals can be considered to be consumed nominally (more or less) at the same rate at which they are delivered.

As noted above, digital program information delivered by one of the above noted networks is variably compressed. For example, video can be compressed according to any of the following standards: MPEG-1, MPEG-2, MPEG-4, H.261, H.263, H.320, JPEG, etc. Likewise, audio can be compressed according to any one of the following standards: "MP3" (MPEG-1 Layer III), MPEG-2, AC-3, AC-4, G.720, ATRAC, "MLP" (Meridian Lossless Packing), Delta-Sigma, etc. If the video is variably compressed, the amount of information needed to represent a "presentation unit" or a given unit of playback time (e.g., a frame or field of video, an audio frame, etc.) varies from presentation unit to presentation unit. Variably compressed signals have timing and scheduling constraints described in the above-noted incorporated applications. Suffice it to say that in a multiplexed signal of one or more programs, each elementary stream has a strict piece-wise time delivery schedule that must be observed to enable proper real-time consumption of a given program. Also, care must be taken to ensure that the relative spacing of time stamps of a given program within a stream is not disturbed too much and that the values of such time stamps are adjusted to reflect any relative movement.

Some of the above networks can also deliver non-real-time data as well as real-time program data. Herein, non-real-time data includes virtually any kind of data which can be delivered independently of the above noted restrictions. That is, such data can be delivered at any nominal rate, at any piece-wise nominal rate, and/or is insensitive to the relative movement of pieces of a constituent part of a given data stream. Such data can be a file, executable code, e-mail, a music file, video mail, an "EPG" (electronic program guide), a web page, etc. Generally, each data stream of the type noted above is not consumed in real-time, i.e., more or less as delivered, or if executed in real-time, is tolerant of pauses in delivery or presentation of the data stream. Hereinafter, such data or data streams are referred to as "best-effort" data or data streams to distinguish them from real-time program data.

The prior art teaches a satellite network for carrying one or more best-effort data streams with television signals to a remote site. At the remote site, another device receives the satellite signal and is capable of extracting one or more of the best-effort data streams for receipt thereat. The device of the remote site can have a telephone return path, including a modem that can connect via the Internet, or other wide area network, to the source of the satellite signal.

Another prior art satellite network teaches a network that solely delivers best-effort data packets to one or more remote sites. At the remote site, a device receives the best-effort data packets and determines if any are destined to other computers at the same remote site. This device transfers such data packets destined to the other computers at the same remote site onto a LAN. The other computers detect the data packets and selectively receive and process each packet destined to the respective computer. These computers can also transfer onto the LAN other packets for transfer back to the source of the received packets. These other packets can be intercepted by the same device which receives packets from the satellite, or a second device, for transfer back to the source via a modem and the Internet or other wide area network.

It is an object to provide an improved system that can easily control multiple nodes in a broadcast network that transmits best-effort data.

It is another object to control multiple nodes at remote sites which might not have a return path to the source of the best-effort data.

SUMMARY OF THE INVENTION

These and other objects are achieved according to the present invention. An illustrative environment of use of the invention is a broadcast satellite network that transmits from a source to multiple remote sites digital real-time program information and best-effort data. One or more of the remote sites have router nodes, which are processing devices capable of "routing" packets. The router nodes are specifically suited for extracting best-effort data streams from the multiplexed signal received via satellite, recognizing which of the data streams are destined to the router node itself, or to other devices at the remote site, and selectively transferring those data streams to the appropriate recipient node at the remote site.

It is desirable to manage these router nodes. However, the invention applies to any nodes of the network that are desirably managed.

According to one embodiment, a manager node forms a packet comprising a network layer header, including a destination address for routing a packet to a destination. The packet also includes a second header identifying a syntax and semantic by which a payload of the packet may be parsed in a predefined fashion, and a payload containing a message to be executed by each of one or more to-be-managed nodes to which the packet is destined. The manager node transmits the packet plural times to a plurality of nodes, including the one or more to-be-managed nodes. The message in the particular packet is executed only a single time by the to-be-managed nodes regardless of the number of times that a copy of the particular packet is received in the state enabling execution by the to-be-managed node of the message therein. The transmission of the particular packet plural times increases the likelihood that each of the to-be-managed nodes receives at least one copy of the particular packet in the state enabling execution of the message contained therein.

Illustratively, the message is a command. However, the message can also be a control message, file download message, auto discovery message, and keep-alive message.

Illustratively, after transmitting the particular packet plural times, the manager node transmits a second packet at least once containing a command for causing one or more of the to-be-managed nodes to execute once a command previously received one or more times in one of the previously transmitted packets. The command is executed once regardless of the number of copies of the particular packet received in a state enabling execution by the to-be-managed node of the command therein. Illustratively, the manager node can insert into the particular packet information identifying a version of the command contained therein for purposes of enabling a to-be-managed node to identify duplicate copies of the command which need not be executed.

Illustratively, each of the one or more to-be-managed nodes lacks a return path for acknowledging to a source of the particular packet that the particular packet has been received in a state enabling execution of the message contained therein. Alternatively, the to-be-managed nodes have a return path.

According to another embodiment, a to-be-managed node receives one or more times a particular packet comprising a network layer header, including a destination address for routing a packet to a destination. The packet also includes a second header identifying a syntax and semantic by which a payload of the particular packet may be parsed in a predefined fashion, and a payload containing a message to be executed by each of one or more to-be-managed nodes to which the particular packet is destined. If an identifier in each received copy of the particular packet indicates that the particular packet is destined for a particular node, the to-be-managed node processes the particular packet, including, in response to detecting the second header, obtaining the message in the particular packet, if possible. If at least one copy of the particular packet is received in a state enabling execution by the to-be-managed node of the obtained message, the to be-managed node executes the obtained message in the particular packet only a single time regardless of the number of times that the particular packet is received in the state enabling execution of the obtained message therein. Again, the transmission of the particular packet plural times increases the likelihood that each of the to-be-managed nodes receives at least one copy of the particular packet in the state enabling execution by the to-be-managed node of the message contained therein.

The message can optionally contain a command. Illustratively, after receiving the particular packet one or more times, the to-be-managed node receives a second packet containing an execute command. The to-be-managed node executes once a command previously received one or more times in a respective previously transmitted copy of the particular packet, regardless of the number of copies of the particular packet received in a state enabling execution by the to-be-managed nodes of the command therein. Illustratively, the to-be-managed node stores each copy of each command received in a respective previously transmitted copy of the particular packet. However, the to-be-managed node executes only one version of each stored command regardless of the number of copies of the particular packet received in a state enabling execution of the command therein. For example, while processing the stored commands, the to-be-managed node can determine if multiple copies of the same command are stored therein by referring to version information contained in the processed packet.

According to another embodiment, a manager node forms a particular packet containing a network layer header, including a destination address (e.g., a multicast address) designating receipt of the packet by a group of nodes (e.g., a multicast group of nodes that can parse messages according to a certain syntax and semantic). The packet also contains a second header identifying a syntax and semantic by which a payload of the packet may be parsed in a predefined fashion. The packet additionally contains a payload containing an identifier previously assigned for designating a particular group of one or more nodes as recipients of the message, and a particular message to be executed by each node of the group. A plurality of nodes is divided into one or more groups, including the particular group. The manager node transmits the particular packet to one or more nodes, including the particular group of nodes. Each node receiving the particular packet, but not previously assigned the identifier contained therein, ignores the packet. Each node of the particular group, but only the nodes of the particular group, executes the particular message contained in the particular packet.

Likewise, according to another embodiment, a to-be-managed node receives a particular packet containing a network layer header, including a destination address designating receipt of the packet by a group of nodes. The packet also contains a second header identifying a syntax and semantic by which a payload of the packet may be parsed in a predefined fashion. The packet additionally contains a payload containing an identifier which has been previously assigned to a particular group of one or more nodes and a particular message to be executed by each node of the particular group. Again, plural nodes are divided into one or more groups, including the particular group. A given node ignores the particular packet if the identifier does not match any identifier assigned to the given node. On the other hand, the given node executes the particular message contained in the particular packet if the identifier matches an identifier assigned to the given node.

According to yet another embodiment, a plurality of nodes is divided into one or more groups, including a particular group of one or more nodes. A manager node receives a specification to send a set of one or more commands to the particular group of nodes, the specification designating the group and not specifying any particular node of the group. If each node of the particular group of nodes has a return path to a source of messages, and if the particular group includes a plurality of nodes then, the manager node does the following for each given node of the group. The manager node transmits a packet containing a network layer header, including an address corresponding to the given node, but not the other nodes, of the group, a second header specifying a syntax and semantic by which the packet may be parsed, and one or more messages of the set. The manager node then waits to receive a response packet acknowledging proper receipt of the packet from the given node. As such, an operator of the manager node can designate a given list of messages for execution by an entire group by reference to an indication of the group, rather than by separately specifying each given node of the group at the time of specifying the specific list of messages to be executed.

BRIEF DESCRIPTION OF THE DRAWINGS

The following detailed description, given by way of example and not intended to limit the present invention solely thereto, where similar elements will be referred to by the same reference symbols, will best be understood in conjunction with the accompanying drawings in which.

DETAILED DESCRIPTION OF THE INVENTION

The invention is now illustrated below for satellite broadcast networks, wherein a signal is transmitted from a single location to multiple remote sites. This is merely for illustration purposes; the invention can be employed in other kinds of networks such as cable, telephone and terrestrial networks. Also, the nodes to be managed according to the invention are presumed to be router nodes at the reception sites. Communication of management messages is presumed to be carried to the router nodes in a signal that is received by many nodes, including nodes that are not the intended recipients of the management messages. Again, this is merely for sake of illustration. The nodes to be managed can be other types of nodes, the nodes to be managed can be located elsewhere in the network and/or communication of management messages to such nodes can be carried in signals via private links not accessible to other nodes. Furthermore, the management messages are described as issuing from a node at the broadcast side of the network. Again, this is merely for sake of illustration. The node issuing the management messages may be located elsewhere in the network.

Figure 1:
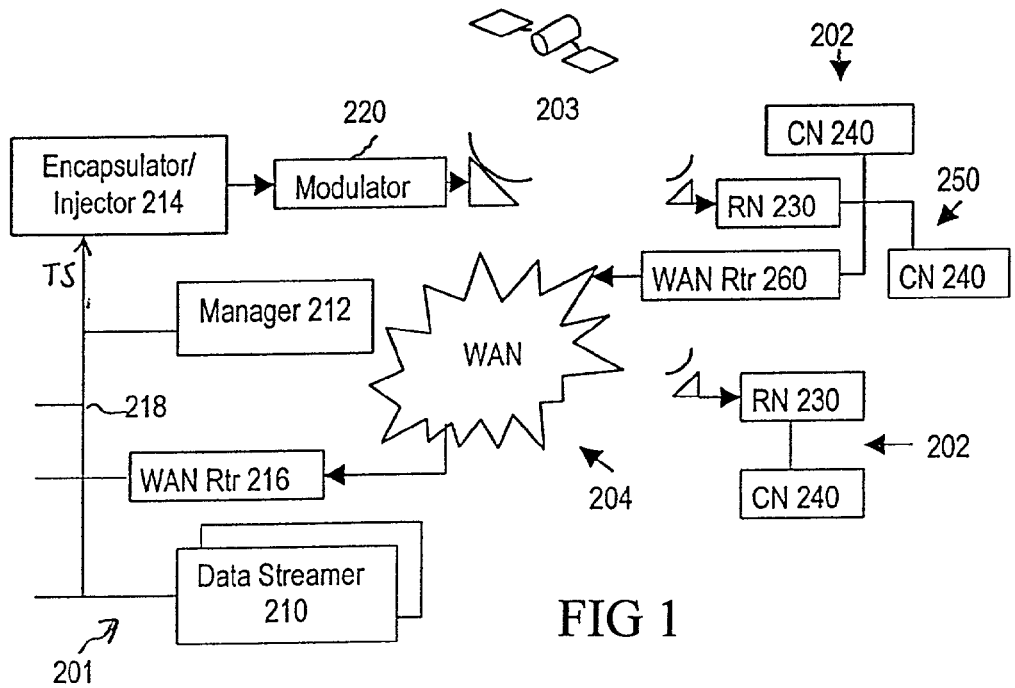
FIG. 1 shows an illustrative network according to one embodiment of the present invention.

FIG. 1 shows an illustrative network 200 in which the invention may be used. The network of FIG. 1 is a satellite broadcast distribution network. In FIG. 1, the satellite network 200 includes a satellite head end site 201, a forward satellite communication path 203, multiple remote receiver sites 202 and a wide area network (WAN) return path 204. The satellite head end site illustratively includes, best-effort data stream servers 210, a manager node 212, a best-effort data stream encapsulator/injector node 214, a wide area network (WAN) router node 216 and a local area network (LAN) 218 connecting such nodes 210–216. The LAN 218 can be one or more high-speed networks such as 100 BASE-T Ethernet networks. The encapsulator/data injector node 214 can include a Source Media Router™ distributed by SkyStream Networks Inc.™, a company located in Sunnyvale, Calif. The best-effort data stream servers 210 can be PC compatible computers running zBand™ Director™ software, which is also distributed by SkyStream Networks Inc.™.

The WAN router node 216 can be any commercially available router, such as a 7200™ series router, distributed by Cisco Systems, Inc.™, a company located in San Jose, Calif. The WAN can be a publicly accessible WAN, such as the Internet, or a private WAN, such as a virtual private network (VPN) that may include a firewall for security. The return path 204 can also be implemented as a wireless channel, e.g., a satellite channel, a terrestrial channel, etc.

The satellite head-end site 201 also includes a modulator 220 connected to receive a digital signal outputted from the encapsulator/injector node 214. The modulator 220 can be any suitable modulator for producing a signal that carries the inputted digital signal provided by the encapsulator/injector node 214, such as the NTC/2080/™ series Variable Rate DVB Modulator, available from Newtec America, Inc.™, a company located in Stamford, Conn. The modulated signal is then transmitted by a suitable (upconverter and) (dish-shaped) antenna.

Also shown, in FIG. 1, the encapsulator/injector node 214 receives a transport stream. The transport stream illustratively is a sequence of transport packets formed according to the MPEG-2 standard. Each transport packet is a 188 byte packet containing digital information of a specific single stream. The inputted transport stream illustratively carries the digital data of the elementary streams that make up one or more real-time programs. The encapsulator/injector node 214 is capable of inserting best-effort data into such a transport stream in a fashion that meets the strict timing and scheduling requirements described above.

The forward path 203 is implemented as the air, space, and a satellite as is well known. Of course, in another network, the forward path 203 could be implemented by coaxial cables, optical fibers, copper wires and suitable electronic equipment for carrying signals on such physical media.

Each receiver site 202 has one or more (very small aperture dish-shaped) antennas for receiving the signal transmitted form the satellite head-end site 201. The received signal(s) is (are) provided to one or more router nodes 230. Each router node 230 is connected to one or more client nodes 240, e.g., by a local area network 250, such as a 10 BASE-T Ethernet. Each client node 240 may be implemented using a PC compatible computer running zBand™ Client™ software available from SkyStream Networks, Inc.™ The router node can be an Edge Media Router™ available from SkyStream Networks Inc.™ One or more of the remote sites 202 can have a wide area network router 260 for connecting to the return path 204. This router 260 can be of the same design as router 230.

Basic Operation of the Network 200

The following describes the basic communication on the network 200. One or more digital program signals are inputted to the encapsulator/injector 214. Illustratively, the digital program signals are inputted as an MPEG-2 compliant transport stream, which is a sequence of transport packets bearing the program signals interleaved together. Each transport packet is a 188 byte packet with a four byte header. The header includes a thirteen bit long packet identifier or PID. Each PID is uniquely assigned to one specific stream, e.g., an elementary stream or component signal of a program. A transport packet with a given PID only contains the data of that specific stream.

The encapsulator/injector 214 locates opportunities to insert other transport packets into the inputted sequence of transport packets that satisfies the above-described piece-wise timing and scheduling constraints. Such transport packets contain data supplied by other devices, such as the data streamers 210 or the manager node 212.

Figure 2:
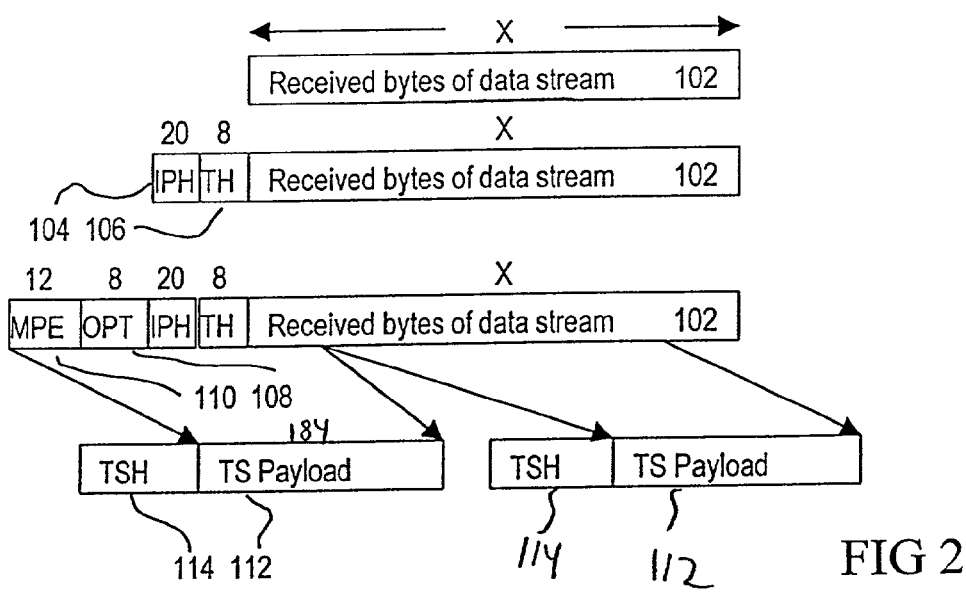
FIG. 2 illustrates the formatting of best-effort data into transport packets according to an embodiment of the present invention.

FIG. 2 illustrates how best-effort data is formatted into transport packets. In the discussion below, it is presumed that all steps are performed by the encapsulator/injector 214. However, it is also possible that one of the devices 212 or 216 supplying the data stream may perform some of the steps. A unit of X bytes of a given data stream 102 is obtained. This unit of information may simply be the stream of bytes of transport layer packets, such as TCP packets or UDP packets. Such packets are transferred via the LAN 218 to the encapsulator/injector 214 as frames formatted according to the Ethernet physical and link layer protocols. (The unit of information 102 containing messages according to this invention that originate from the manager node 212 can also be encapsulated via an IP forwarding service, a UDP service, or a TCP service provided by the encapsulator/injector 214.) The encapsulator/injector 214 simply extracts the information carried in these frames as they arrive.

Next, the encapsulator/injector 214 appends a transport layer header (TH) 106 and a network layer header (IPH) 104 to the unit of information 102. The transport header 106 can be a UDP or TCP header. An 8 byte UDP transport layer header 106 is shown. In addition, the network layer header 104 is an IP header. An IP header includes a source address, which is the IP address of the node that transmitted the packet, and a destination address, which is the address assigned to the node or nodes which are to receive the packet. Destination addresses may be unicast addresses assigned to only a single node or multicast address assigned to a multiple nodes that have subscribed to a multicast group.

Afterward, the encapsulator/injector 214 appends a 12 byte MPEG encapsulation (MPE) protocol header 12, and may also append an optional (OPT) 8 byte long field 108 according to the MPE protocol. MPE is a standard for encapsulating data in transport packets promulgated by the Digital Video Broadcast (DVB) standards body in standards document EN 301 192. The encapsulator/injector 214 segments the unit of information thus formed into 184 byte long transport packet payloads 112. The encapsulator/injector 214 attaches a transport stream header 114 to each 184 byte payload. The encapsulator/injector 214 inserts a particular PID into each transport stream header 114 to indicate that the transport packet contains best-effort data. Illustratively, all best-effort data streams use the same PID. The encapsulator/injector 214 then transmits the transport packets bearing best-effort data within the outputted transport stream.

The modulator 220 modulates the transport stream onto one or more frequency channels. Illustratively, the modulator can receive separate transport streams (not shown) for each frequency channel on which the modulator 220 can modulate digital information. As an example, it is presumed that the modulator 220 QPSK modulates a transport stream on a 22 MHz wide frequency channel, located in the range of 950 MHz–2,150 MHz. The modulated signal is then transmitted via the forward path 203 to the remote sites 202.

At the remote sites 202, each router node 230 is configured to tune to a specified frequency channel. Illustratively, the router nodes 230 each tune to the frequency channel carrying best-effort data (and possibly also carrying program data). The router nodes 230 demodulate the transport stream from the tuned frequency channel. The router nodes 230 then filter out only those transport packets having a specific PID, or one of a list of PIDs, for which they have been configured to accept. All other transport packets are discarded or ignored. Illustratively, the router nodes 230 are configured to select those transport packets having the same PID(s) assigned to carrying best-effort data. The router nodes 230 recover from each payload 112 the portions of the unit containing the headers and fields 110, 108, 104, 106 and 102.

Next, the router nodes 230 examine the IP destination address in the network layer header 104. If the IP destination address is an address assigned to one of the client nodes 240 on the LAN 250 to which a given router node 230 is connected, the router node 230 transfers the packet onto the LAN 250. Alternatively, if the IP destination address is one of the address assigned to the router node 230 itself (e.g., a MAC address, or a multicast address assigned below for receiving management messages) the router node 230 processes the packet to which the IP destination address is appended. If the IP destination address is not otherwise recognized, the router node 230 discards or ignores the unit 102–110.

Manager Node 300 and Router Node 400 Architectures

Figure 3:
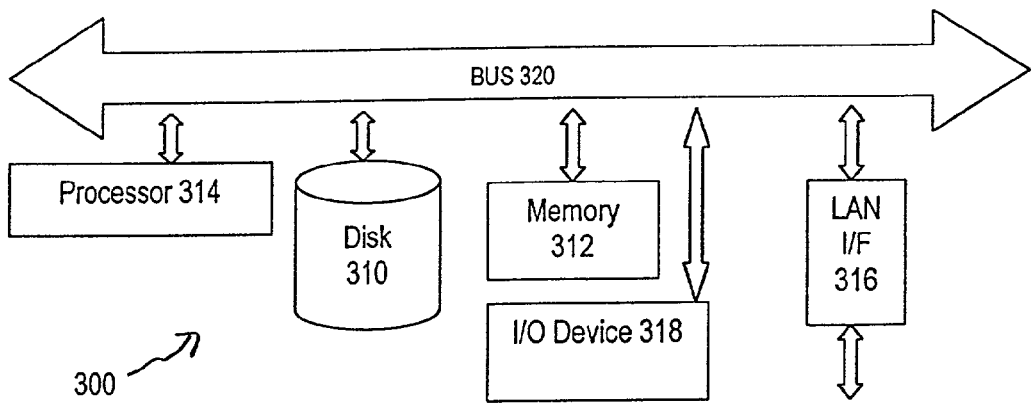
FIG. 3 shows an illustrative router node according to an embodiment of the present invention.

The manager node 212 may be implemented as a PC compatible computer on which is installed suitable software for achieving the functions according to the present invention. FIG. 3 shows a manager node according to an embodiment of the present invention. Illustratively, the manager node is implemented as a PC compatible computer 300. The manager node 300 illustratively includes a disk memory 310, a main memory 312, a processor 314, a network interface (e.g., an Ethernet network interface card or NIC) 316, an input/output device 318 and a bus 320. The illustration in FIG. 3 is actually a simplified architecture. For instance, the bus 318 is typically implemented as multiple separate busses with bridges for transferring information between the busses. Also, a separate high speed cache memory is often provided. Furthermore, the input/output device 318 is intended to subsume any combination of: a keyboard, pointer device (e.g., a mouse, a touch screen sensor, a joy stick, a track ball, a track pad, a light pen), a graphics accelerator card, a display monitor, loudspeakers, a sound card, etc. as is deemed necessary to perform the functions described below. For example, in case that a separate operator console is provided for monitoring and controlling the functioning of several devices at the satellite head-end site 201, a separate keyboard, pointer device and display monitor can be omitted from the specific configuration of the manager node 300 and replaced with a suitable interface for communicating with the operator console.

The manager node 300 may contain operating system software, such as Windows NT™, available from Microsoft Corp.™, a company located in Redmond, Wash., or LINUX. The manager node 300 may also contain one or more standard window browsers, such as Iexplore™, available from Microsoft Corp.™, or Netscape Navigator™, available from Netscape™, a company located in Mountain View, Calif. The manager node 300 may also contain HP Open-View™, distributed by Hewlett Packard Corporation™, located in Palo Alto, Calif. Such software, as well as other software, is stored in memory, e.g., the disk memory 310, the main memory 312 or both, and is executed by the processor(s) 314 and other devices in a well-known fashion.

Figure 4:
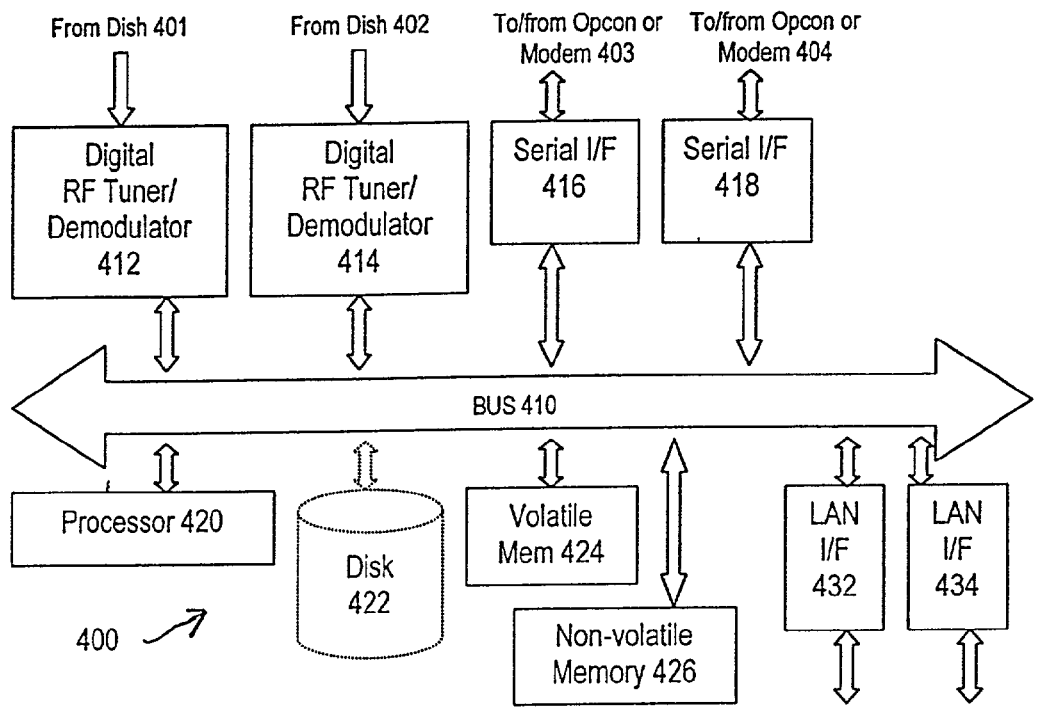
FIG. 4 shows an illustrative manager node according to an embodiment of the present invention.

FIG. 4 shows a router node 230 which can be implemented by suitably modifying an EMR-5000™ distributed by SkyStream Networks, as described herein below. As shown in FIG. 4, the router node 400 preferably has one or more digital RF tuners/demodulators 412, 414, one or more serial interfaces 416, 418, a processor 420, volatile memory 424, e.g., including one or more SDRAM IC's, a non-volatile memory 426, e.g., including one or more Flash memory IC's, and one or more local area network interface's 432, 434 (e.g., Ethernet NIC's). In addition, a disk memory 422 may also be provided. A bus 410 is provided for communicating signals between each of the other devices 412–434.

The non-volatile memory 426 is for storing software for operating the router node 400. Illustratively, the non-volatile memory 426 contains two areas, namely, a "locked" area and an "unlocked" area. Illustratively, the locked area prevents unauthorized access to the memory, including preventing an over-write or erase operation. This secures the non-volatile memory 426 against inadvertent or unauthorized modification. The unlocked area is designed to facilitate writing and erasing operations. This provides the ability to upgrade the software of the router node 400. A manner for upgrading the software is described in greater detail below.

The volatile memory 424 is generally used as a "working memory," e.g., to store executable code or data structures actively processed. In particular, the volatile memory 424 implements a command queue in which commands received according to an embodiment of the present invention are stored pending execution. As described in greater detail below, commands are stored for a settable period of time, e.g., 60 minutes, pending receipt of an execute command. If the execute command is not received within the period of time, the commands waiting in the queue are discarded and not executed.

The processor 420 is for processing, i.e., executing code, manipulating data, etc. Through execution of code in the memory 424 or 426, the processor 420 controls the operation of the other devices 410–418 and 422–434 of the router node 400 and causes the router node 400 to perform the functions described below.

The digital RF tuner/demodulators 412, 414 are preferably custom circuit boards which include commercially available integrated circuits (ICs) capable of receiving a wideband signal containing one or more frequency channels, tuning to a specific frequency channel, and recovering digital data of the frequency channel. An example of a suitable IC is the model SL 1935C, distributed by Zarlink Semiconductor™, a company located in Ottawa, Ontario, Canada. Such an RF tuner/demodualtoru 412 or 414 can receive an input (from the processor 420, via the bus 410) specifying a particular frequency channel to tune. In response, the digital RF tuner/demodulator 412 or 414 filters out the specified frequency channel and recovers a digital signal from the tuned frequency channel. Such digital data may be stored in the volatile memory 424 for processing by the processor 420.

The serial interfaces 416, 418 are for enabling communication between the router and an external device, such as an operator console, modem, printer, etc. Illustratively, these interfaces 416, 418 are RS 232 interfaces, although they can be any well-known serial interface. As is well known, any data in the router node 400, e.g., in the memory 424, can be transferred to the external devices via the respective interfaces 416 and 418 to which such external devices are connected. Likewise, data originating from the external devices can be transferred to the router node 400, e.g., to the volatile memory 424, via the respective interface 416, 418 to which such external devices are connected.

The LAN interfaces 432, 434 are for connecting the router node 400 to a respective LAN. Each of the LAN interfaces 432, 434 can receive data transmitted on its respective connected LAN at the router node 400, e.g., for temporary storage in the volatile memory 424 and can also transmit data in the router node 400, e.g., temporarily stored in the volatile memory 424, on its respective LAN.

Both the manager node 300 and the router node 400 have additional software for performing the functions described below. This software is designed to cooperate with the commercially available software described above in a well-known fashion. For example, the software described below is intended to execute on the specific operating system provided on the manager node, and can employ the application programming interface (API) specified by the distributor of the respective operating system. In addition, the software may include one or more "plug-in" components for use with the respective browser or other software. As this form of cooperation is well documented by the distributor of the respective software, or otherwise well known, it is not described further. Suffice it to say that providing the software in a fashion that cooperates with other commercially provided software is well within the skill in the art.

Illustratively, the system 200 of FIG. 1 supports the Simple Network Management Protocol ("SNMP"). See J. Case, M. Fedor, M. Schoffstall & J. Davin, A Simple Network Management Protocol, RFC 1157 (May 1990). According to SNMP, a managed device is controlled through interaction with a management information base (MIB). The MIB is a hierarchical data structure containing objects. Each object is a collection of parameters representing an aspect of the managed device that can be monitored or controlled. According to SNMP, a control device can issue a command to read the current values of the MIB of a device to be managed. The device to be managed replies by returning the requested values. This enables the control device to determine the current state of the device to be controlled. The control device can also issue commands, most notably, instructions to write new values, or otherwise modify the current values, of parameters of the device to be managed. The device to be managed causes the appropriate changes to the parameters as instructed. This in turn can change the behavior of the to-be-managed device.

SNMP requires the to-be-managed device to respond to the device issuing the commands. SNMP therefore requires a return path as well as a forward path between the controller and controlled device.

Provisioning the System

Initially, the manager node 212 (FIG. 2) must somehow be configured to know about all of the router nodes 230 that can be managed. This can be done in an automatic fashion for those router nodes 230 that have a return path 204 to the manager node 212. Assume that each router node 230 is provided an IP address in a known range. An operator can execute a command causing the manager node 212 to attempt to automatically discover each router node 230. The operator can specify one of three manners of searching for IP addresses of router nodes in the network 200:

(1) The manager node 212 issues a "ping" packet with each IP address in a range of IP addresses specified by the operator. Each such ping packet is carried by the forward path 203 to all of the remote sites 202. At each remote site 202, if a given router node 230 has the same IP address as that specified in the ping packet, the given router node 230 transmits a reply packet via the return path 204 to the manager node 212. This is achieved by the router node 230 forming a reply IP packet containing as the destination address, the IP address of the manager node, i.e., the IP address in the source address field of the received ping packet. The router node 230 then transfers the reply packet on its LAN 250 to the WAN router node 260 that transmits the reply packet back to the satellite head-end site 201. The WAN router 216, at the satellite head-end site 201, forwards the reply packet onto the LAN 218 where the manager node 212 receives it. Of course, if the IP destination address in the ping packet does not match the IP address of the given router node 230, the given router node 230 discards/ignores the packet. Based on the received replies, the manager node 212 then forms a list of the IP address indicating all router nodes 230 that can be managed. This list can be stored in the volatile memory 424.

(2) The manager node 212 issues a "read" packet according to SNMP destined to each IP address in a range of IP addresses specified by the operator. As before, each of these read packets is transmitted by the forward path 203 to all of the remote sites 202. Again, at each remote site, each router node 230 determines if the IP address in the packet matches an IP address of the router node 230. If not, the router node 230 ignores/discards the packet. If the IP addresses match, the router node 230 processes the packet. In the case of an SNMP read packet, the router node 230 retrieves the appropriate information requested by the read operation and transmits the information back via the return path 204 to the manager node 214. If the manager node 212 receives a reply from a router node 230 with a given IP address, the manager node 212 will identify the router node 230.

(3) The manager node 212 can issue a "multicast" packet using an address to which all router nodes 230 are pre-programmed to respond. The manner by which this is achieved is described in greater detail below. Advantageously, the software provided for each router node 230 can preliminarily configure each router node 230 to accept packets containing a particular preselected multicast address. Furthermore, the software can cause each router node 230 to reply with a simple acknowledgement packet providing only basic information about itself, or more extensive information.

For those router nodes 230 lacking a return path, an operator can manually input data at the manager node 212 that identifies each such respective router node 230. For example, the operator can manually input the MAC address of each such router node 230 and other useful information for managing such router nodes 230.

Preferably, the manager node 212 provides a graphical user interface (GUI) for performing the auto-discovery and manual identification of router nodes 230. This interface preferably uses a windows-based GUI. However, the manager node 212 also provides a simple command line interface for enabling the operator to enter simple textual commands for identifying router nodes 230.

After the router nodes 230 in the network are identified, they can be provisioned. This is achieved by issuing commands from the manager node 212 to the router nodes 230 for changing various parameters or instructions at the router node 230. One manner for issuing commands is described in greater detail below.

Group Management

One advantage provided by the invention is the ability to organize the router nodes 230 into groups for sake of simplifying the process of controlling them. The organization of the router nodes 230 into groups is achieved using the manager node 212. Specifically, an operator of the manager node 212 can divide the identified router nodes 230 into distinct or overlapping groups. Subgroups containing a subset of the router nodes 230 of a group can also be defined, and thus a hierarchical arrangement of groups and subgroups is supported.

At the manager node 212, the operator designates a new group, or a new subgroup of an existing group or subgroup, by manual input, e.g., using the command line interface or the window-based graphical user interface. The operator then selects identified router nodes 230 for placement in the new group or subgroup. In the case of a group, the operator may select any identified router node 230 for placement in a group. In the case of a subgroup, the operator may select for placement in the new subgroup, any router node 230 in the parent group/subgroup of the newly formed subgroup.

Two types of group control are supported, namely, (1) SNMP, and (2) a control technique provided according to an embodiment of the invention referred to as SkyStream™ Multicast Management Protocol or SMMP. In the case of SNMP, the manager node 212 simply stores a list of all router nodes 230 in each group or subgroup.

In the case of SMMP, a multicast group is defined for transmitting SMMP messages. For example, a default multicast address may be preliminarily stored in each router node 230 which enables the router node 230 to receive messages according to an embodiment of this invention. Alternatively, or in addition, the manager node 212 can transmit one or more management messages for setting the multicast address to use for messages according to the invention.

All messages transmitted to groups according to SMMP are carried in packets containing the preliminarily defined multicast address. As described in greater detail below, each SMMP packet also carries additional information, called a session identifier, for enabling each router node 230 that is part of a given group to determine whether or not the packet is destined to that router node 230.

The operator can also remove individual router nodes 230 from groups by manual input at the manager node 212. If the group or subgroup is controlled according to SNMP, then the manager node 212 simply deletes the node from the list of router nodes 230 associated with the respective group or subgroup from which the router node 230 was removed. In the case that the group or subgroup is controlled according to an embodiment of the invention, the manager node 212 also transmits a command to a given router node 230 to cause the router node 230 to close the session of the group or subgroup from which the router node 230 was removed. Thereafter, the router node 230 will ignore packets containing the above session identifier of the group or subgroup from which it was removed.

"SMMP" Message Packet Format

For reasons discussed below, a new packet format is needed for carrying messages under certain circumstances. For example, as discussed above, SNMP can be used to manage router nodes 230 which have a return path 204. In case no return path is available, messages can be sent using a SMMP format described herein. However, it should be noted that SMMP can be used even when the router nodes 230 have a return path 204.

Figure 5:
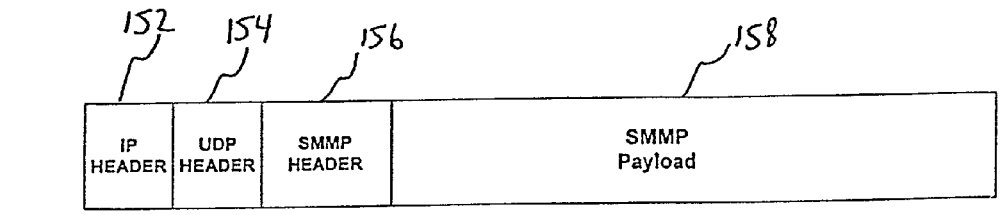
FIG. 5 shows an SMMP packet according to an embodiment of the present invention.

FIG. 5 illustrates a packet 150 formed according to this embodiment of the present invention. As shown, a packet 150 includes an IP network layer header 152, a UDP transport layer header 154 and an SMMP header 156. The SMMP header 156 is recognizable by the router nodes 230, which can determine that the payload 158 is parseable according to the syntax and semantics of SMMP.

Figure 6:
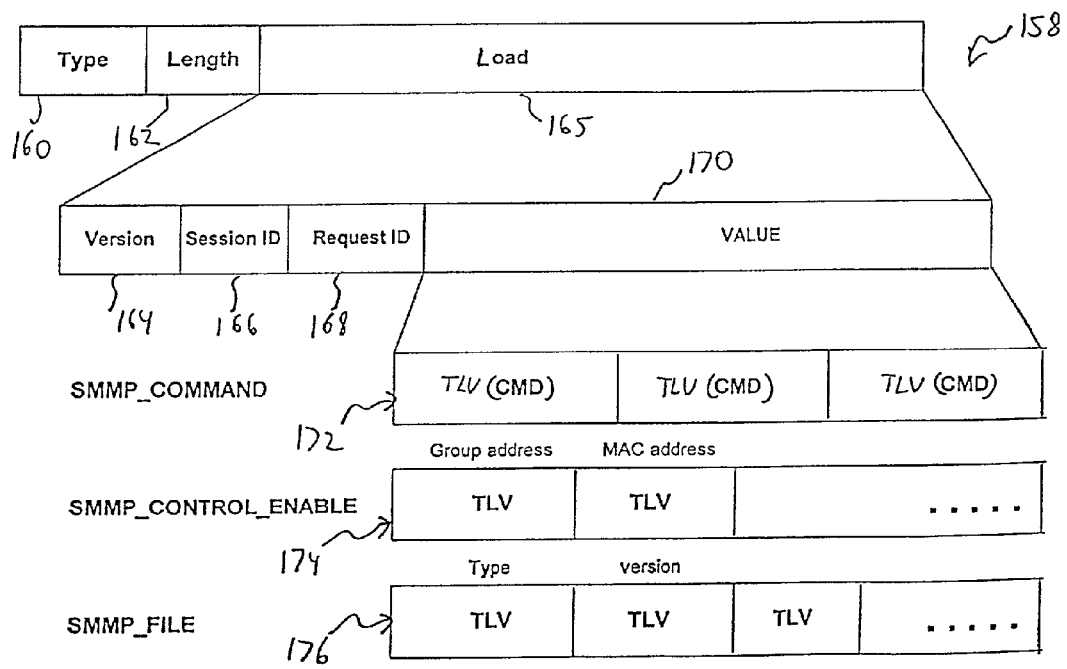
FIG. 6 shows an SMMP payload of the SMMP packet of FIG. 5 according to an embodiment of the present invention.

As shown in FIG. 6, the payload 158 includes an SMMP message having a two-byte type field 160, a two-byte length field 162, and a variable length load 165. Load 165 includes a two-byte version field 164, a two-byte session identifier field 166, a four-byte request identifier field 168, and a value field 170 of variable length.

The type field 160 indicates the type of message contained in the SMMP message packet. These include control types, command types, file download types, auto discovery types, and keep-alive types, each of which will be described herein below. Additional types can be added in the future and the software at the router nodes 230 can be updated to support parsing and processing of the new types of messages. The length field 162 specifies the byte length of the SMMP message packet. The version field 164 specifies the version of SMMP according to which the SMMP message should be parsed. The session identifier field 166 contains a value for identifying a session with a router node 230. One session identifier is opened for each defined group and subgroup. Router nodes 230 only execute SMMP messages with the current session identifier for a group or subgroup to which they have been assigned. All other SMMP messages are ignored by the router nodes 230, except as described below.

The request identifier 168 is for purposes of numbering messages issued to a given router node 230, or group of router nodes 230, in a particular session. The first message sent from the manager node 212, to a given router node 230 or group of router nodes 230, has a value in this field set, e.g., to one. Each subsequent command sent in the specific session, to the respective router node 230 or group of router nodes 230, will have a request identifier that is one higher than the previous sent to the respective router node 230 or group of router nodes 230. In other words, the value of the request identifier 168 increments by one for each SMMP message in a given open session. Load 165 further includes value field 170 of variable length. As shown in FIG. 6, the value field has a variable number of parameters, where a tag-length-value (TLV) format is used to separate each parameter.

The type field 160 specifies the type of the message. Examples of the type of message are:

(1) SMMP control—this type of message is for issuing special control commands. A first type of message, "an enable message," is issued to enable a router node 230 and issue a session identifier in the field 166 for use by the router node 230. Specifically, when instructed by an operator to assign a router node 230 to a group (or subgroup), the manager node 212 issues an SMMP control packet to the MAC IP address of the router node 230. This control packet contains the session identifier of the group (subgroup) to which the router node 230 has been assigned. In response, the router node 230 stores the session identifier as an active session identifier. Afterwards, the router node 230 will only accept SMMP commands with an active session identifier stored at that router node 230. SMMP commands having different session identifiers will be ignored by the router node 230 upon receipt. Further, an enable message may also carry timeout values to the router nodes. For example, suppose no SMMP keep-alive message (described below) is received for a period of time exceeding the time out period. After the period of time (set by the timeout value) has expired, the router node 230 will close the session and will purge all stored messages from its memory. Thereafter, the router node 230 will cease accepting SMMP messages with the closed session identifier. A second type of message, "a configuration message," is for issuing special configuration commands, such as commands for changing time out periods or other parameters associated with the SMMP. In this type of message (and in SMMP file download described below), the value field will contain a sequence of one or more control messages 174 to be executed in TLV format.

(2) SMMP command—this type of message is for issuing general commands, such as accessing (reading or writing) the current value of a parameter, ordering a change in the frequency channel of the router node 230, ordering a software upgrade, clearing unexecuted commands stored in memory, and ordering the execution (i.e., processing) of all stored commands (known as a "global trigger"). Additional commands can be defined in the future and the router node 230 software can be upgraded easily as described below to parse and process such commands. As noted above, the session identifier in the field 166 must be the correct value as specified by a previously sent SMMP control command enabling the router node 230. In this type of message, the value field will contain a sequence of one or more commands 172 to be executed in TLV format. Illustratively, each of these commands of the sequence includes a version value which can be used by a router node 230 to identify duplicate copies of commands not to be executed, as described below.

(3) SMMP file download—this type of message is used to download a file to a router node 230. For example, the download may include a software upgrade or new software configurations. Note that each packet typically includes only a "chunk" of the file, so that a complete file comprises a plurality of chunks, and in turn, a plurality of SMMP message packets. The SMMP file download packet includes various tags, such as file_type (kernel, fixed key, etc.), total_size (the total size in bytes—usually sent in the first message), file_chunk (indicates the current chunk in the packet), chunk_offset, no_of_packets (the total number of packets for the complete file), current_packet_no (the count of the current packet), and file_time_out (the predetermined amount of time until the memory discards stored data). These tags are formatted in value field 170 as a list of TLV units 176, as shown in FIG. 6.

(4) SMMP auto discovery—this type of message is used to discover router nodes 230. Using this message type, a manager node 212 can issue a single multicast message to all of the router nodes 230 in order to identify them. (An SMMP auto discovery message need not have a session identifier in order to be processed by the router nodes 230.) Upon receipt, each router node 230 with a return path 204 will transmit back to the manager node 212 a message indicating the MAC address of the router node 230.

(5) SMMP keep-alive—this type of message is used to keep a session open, and to keep the session from timing out. That is, each router node 230 will only hold a command in its queue or memory for a predetermined amount of time (e.g., via a SMMP control message packet) before it purges it (or is sent a global trigger to execute all stored commands). However, once a keep-alive message is received, the predetermined time out period is reset and the session remains alive.

SNMP Managemet Communication

The system 200 supports two manners of communicating management messages. In a first scenario, the router nodes 230 lack a return path 204 to the satellite head-end site 201. As will be described below, communication under this scenario must use SMMP. However, it should be noted that SMMP can be used even when a return path 204 is available to the router nodes 230.

In a second scenario, the router nodes 230 that have a return path 204 for transmitting information back to a source of information, such as the manager node 212 at the satellite head-end site 201. In the second scenario, the manager node 212 transmits a message a single time, e.g., via the forward path 203, which is sent to all remote sites 202. The manager node 212 then waits a certain predefined time period after transmitting the message for a reply or acknowledgement from all intended recipient router nodes 230. If the manager node 212 fails to receive a reply or acknowledgement message from each intended router node within the predefined time period, the manager node 212 presumes that the silent router nodes 230 did not received the message transmitted from the manager node 212. In such a case, the manager node 212 again transmits its message to all remote sites 202 and waits to receive the reply or acknowledgement message therefrom. This process may be repeated as necessary or up to a predetermined threshold maximum number of times.

Figure 7:
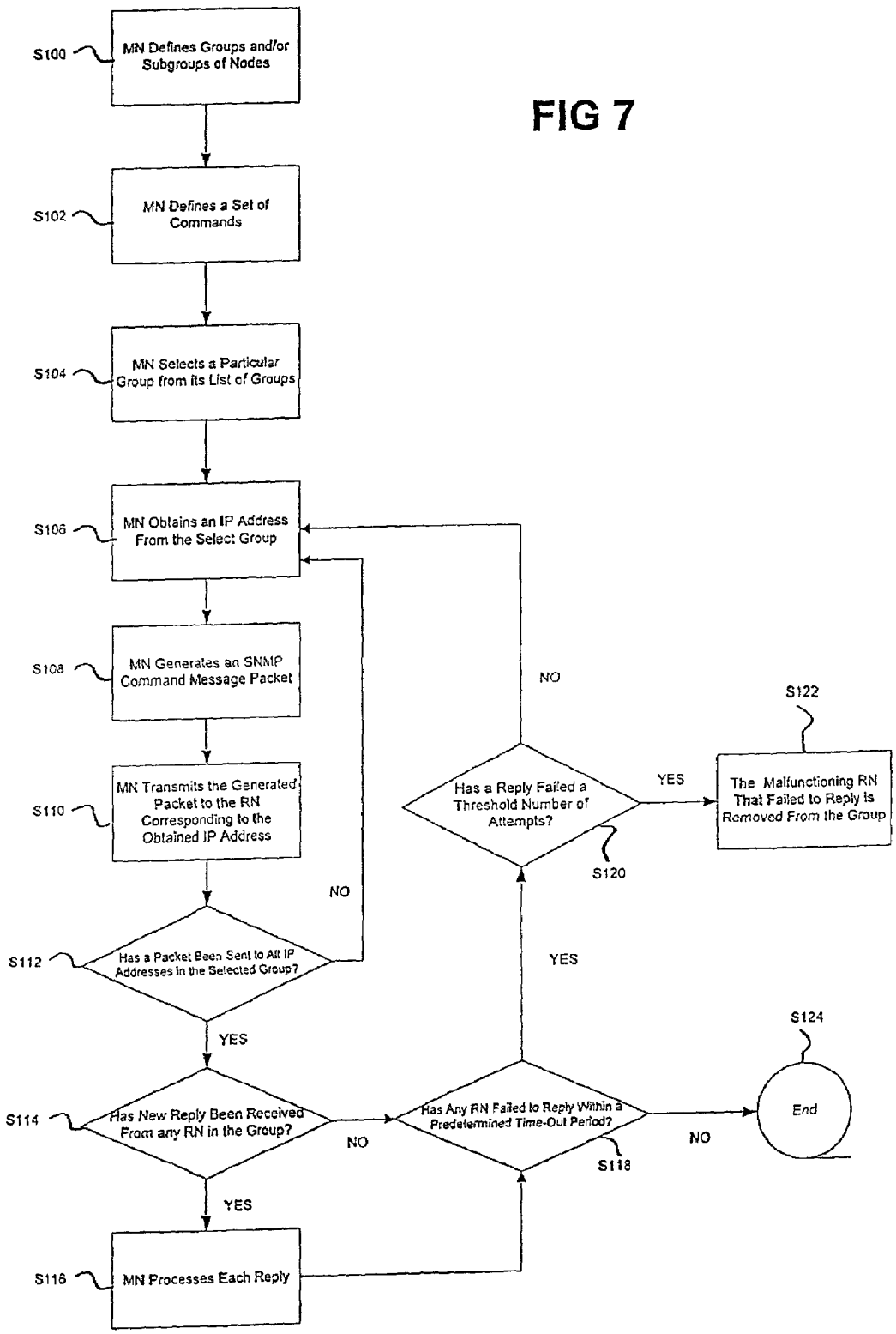
FIG. 7 illustrates a flow chart that sets forth a process by which SNMP packets are transmitted to multiple router nodes in groups or subgroups of router nodes according to an embodiment of the present invention.

SNMP requires the ability to send reply or acknowledgement messages from the router nodes 230 to the manager node 212. As such, SNMP can only be used with router nodes 230 possessing a return path 204 to the manager node 212. As can be appreciated, it can be quite tedious for the operator to perform separate manual input for issuing commands to plural nodes, when each of the plural nodes is to receive the same set of commands. The division of the nodes into groups and subgroups simplifies this task for the operator. The specific process by which an operator can cause the manager node 212 to issue the same set of commands to plural nodes is illustrated in the flow-chart of FIG. 7.

In step S100, the operator of the manager node 212 defines groups and/or subgroups of nodes, e.g., as described above. The operator of the manager node 212 places one or more router nodes 230 in each defined group or subgroup thereby generating at the manager node 212 a list of all router nodes 230 in each defined group or subgroup.

In step S102, the operator of the manager node 212 defines a set of commands to be executed at each node of any selected, previously defined group or subgroup. The operator can easily add to or remove commands from the set in step S102 until the operator is satisfied with the set of commands to be executed. Illustratively, the GUI of the manager node 212 displays the parameters of the MIB of the routers nodes 230 hierarchically to facilitate selection of specific parameters to access (write or read) thereby facilitating generation of a MIB access command. The manager node 212 thus generates a list of commands to be executed.

Next, in step S104, the operator of the manager node 212 specifies a particular group or subgroup of nodes (from the previously defined list of groups or subgroups) to execute the commands. Note that the operator of the manager node 212 could also specify a sole router node 230 to execute the commands of the list. In response, the manager node 212 obtains the list of router nodes, specifically, the list of IP addresses and MAC addresses of each router node 230 in the specified group or subgroup.

In step S106, the manager node 212 obtains a first pair of IP and MAC addresses from the group list, i.e., the IP and MAC addresses of one of the router nodes 230 of the group or subgroup. Note that all pairs of IP and MAC addresses in the specified group or subgroup will ultimately be obtained, as steps S106–S112 will be repeated for each router node IP/MAC address pair of the group or subgroup.

In step S108, the manager node 212 generates a series of packets for transmission containing SNMP formatted messages for executing the commands of the list. Illustratively, these packets are UDP/IP packets, including an IP network layer header and a UDP transport layer header. The IP layer header includes the obtained IP address of one of the router nodes 230 of the group or subgroup as the destination address of the packets. The payload of the packets includes the appropriate message for executing the commands.

In step S110, the manager node 212 transmits these packets to the remote sites 202 to be recognized by the router node 230 corresponding to the obtained IP/MAC addresses. Illustratively, the manager node 212 transfers the packets to the encapsulator/injector 214 via the LAN 218 and the encapsulator/injector 214 inserts the packet into the transport stream. The packet is thus carried by the forward path 203 to the remote sites 202. Note that the manager node 212 may optionally set a time delay to transmit the command message packets some time in the future.

Next, in step S112, the manager node 212 determines whether or not the command set packets have been transmitted to all router nodes 230 of the group or subgroup. If the determination is no, then steps S106–S112 will be repeated until the packet is sent to all IP/MAC address pairs of the group. Accordingly, in step S106, the manager node 212 obtains a second IP/MAC address pair from the selected group, and so on. If the determination is yes (e.g., if there are five router nodes 230 in the group, then steps S106–S112 have been repeated five times), then the process proceeds to step S114.

In step S114, the manager node 212 determines if a new reply message (from the router node 230 corresponding to the selected IP/MAC addresses) has been received. If so, then in step S116, the manager node 212 processes the reply. The processing may be simple such as determining that the command had been successfully carried out. However, the reply message may contain data. For example, if the commands were read commands for reading out the current state/value of parameters or other information at the router node 230, then the reply message may contain the requested data. The manager node 212 stores such information so that it is available for display or transfer to another device, e.g., via LAN 216. If a new reply message has not been received, then the process proceeds to Step S118.

In step S118, the manager node 212 determines whether or not any router node 230 has failed to return a reply message within the predefined time out period for a reply. If not, then the process ends at step S124. However, if one or more router nodes 230 have failed to reply within the predefined time out period, the manager node 212 executes step S102. In this step, the manager node 212 determines whether or not any router nodes 230 have failed to reply to a threshold maximum number of transmission attempts. If so, then the manager node 212 executes step S122 in which the errant router node 230 is determined to have malfunctioned. The manager node 212 reports an error and removes this router node 230 from the consideration list.

On the other hand, suppose the manager node 212 has attempted to transmit the command set to this router node 230 less than the maximum threshold limit number of times. In such a case, the manager node 212 increments a counter of the number of transmission attempts for this router node 230 by one and repeats steps S106–S112 for this router node. Processing then continues as set forth above from step S114.

It should be noted that steps S106–S112 and steps S114–S122 can be separated into two separate, contemporaneously executed, multi-tasked processes. In addition, it is also possible to transmit one set of packets to a single router node 230 and wait for a reply message from that single router node 230 before sending the set of packets to the next router node 230. However, it is advantageous not to delay the receipt of commands by some router nodes 230 while another router node 230 that previously received the command set is responding.

The operator can also specify a time delay to delay execution of steps S106–S114 at a later time, at the time of selecting the commands to be executed by the group or a single router node 230.

SMMP Management Message Communication

Figure 8:
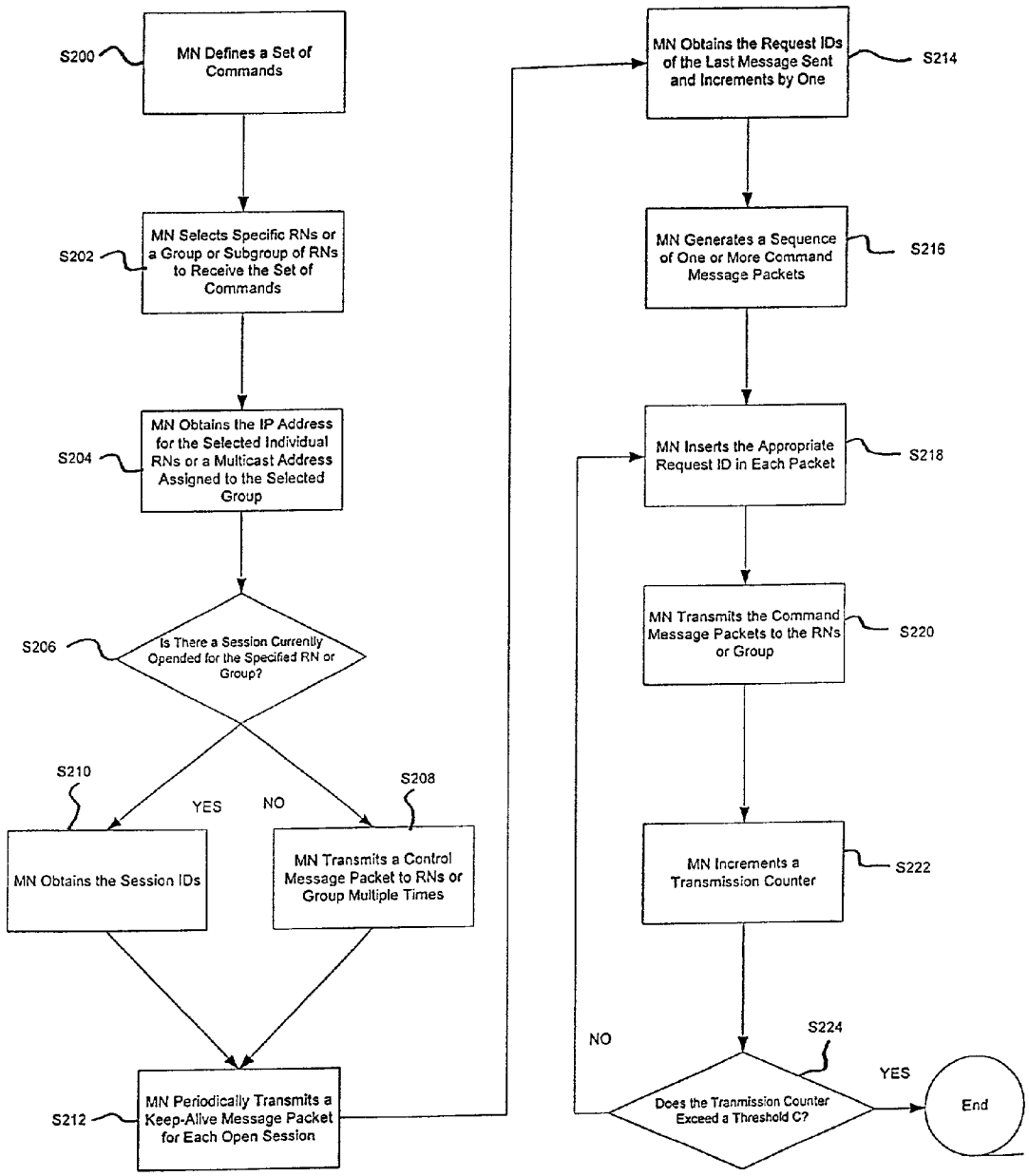
FIG. 8 illustrates a flow chart that sets forth a process by which SMMP packets are transmitted to multiple router nodes in groups or subgroups of router nodes according to an embodiment of the present invention.

FIG. 8 shows a process for issuing control and command messages from the manager node 212 to router nodes 230. SMMP can be used either for router nodes 230 that have a return path 204 or for router nodes 230 lacking a return path to the manager node 212.

In step S200, the operator specifies by, e.g., manual input at the manager node 212, the set of commands to be executed by the router nodes 230 to be managed. This step is similar to step S102 of FIG. 6 described above. Next, in step S202, the operator specifies by, e.g., manual input at the manager node 212, the specific router nodes 230 which are to receive the commands. The operator can specify a single router node 230 or a group/subgroup of router nodes 230. If a single router node 230 is specified, the manager 212 retrieves the IP and MAC address of the router node 230.

Next, the manager node 212 determines sets of certain parameters (i.e., enable and configuration controls) needed for the transmission. In the case of group communication, in step S206, the manager node 212 determines (via, e.g., internal records) if a session is currently open for the specified group/subgroup of router nodes 230 that is to receive the controls. If not, in step S208, the manager node 212 transmits SMMP control messages to each router node 230 of the group/subgroup for enabling the specified router node 230 of the group/subgroup of router nodes 230. These messages designate a unique session identifier for use by all router nodes 230 of the respective group/subgroup of router nodes 230. Illustratively, the identical command may be transmitted multiple times to ensure that the specified router node 230 or group/subgroup of router nodes 230 receive the command. If a session is already open, the manager node 212 simply obtains the session identifier for the session, in step S210. Illustratively, the manager node 212 stores a table of defined groups/subgroups and session identifiers associated with them.

In step S212, the manager node 212 illustratively periodically transmits an SMMP "keep-alive" message for each open session to the respective router node 230 or group/subgroup of router nodes 230 corresponding to the message.

Such SMMP keep-alive messages are carried in SMMP packets as noted above. An SMMP keep-alive message causes each router node 230 to which the message is destined, to maintain the session as open and not time out the session. In other words, the keep-alive message causes the router node 230 to reset its internal timer for the session and not close it. If a router node 230 deems a session to have ended due to a time out (i.e., a keep-alive message packet was not timely received), then the router node 230 in the session will purge all commands stored in memory and stop receiving messages for that session.

The manager node 212 also obtains the request identifier of the last message sent in the session and increments the number for the next message. Illustratively, this request identifier can also be stored in a table or in the same table as the session identifier. In the case of a new session, a new request identifier is generated with an initial value, such as one.

Next in step S216, the manager node 212 generates a sequence of one or more packets containing the commands to be executed. Preferably, these packets have the form shown in FIG. 5. In making such packets, the manager node 212 assigns a unique version number to each command in the sequence of commands in the packets. For example, the manager node 212 can keep track of the version number of the last command sent to the respective router node 230 or group/subgroup of router nodes 230. The manager node 212 inserts the unique version numbers into the respective commands.

As previously explained, the manager node 212 transmits duplicate message packets to increase the odds that the packet will be received by the router nodes 230. (For example, in case there is no return path from the remote nodes back to the manager node, it is not possible for a router node 230 to send a reply or confirmation acknowledging receipt of a packet). Accordingly, as described below, each router node 230 will first compare the session ID of each newly received packet. If the session ID is not the current session, the packet is ignored. However, if the session ID matches, the router node 230 stores the command set in its queue.

In step S218, the manager node 212 inserts the appropriate request identifier in the request identifier field of the packets. The request identifier of the previously transmitted message is incremented by one and this incremented request identifier is inserted into the packets carrying the message. The manager node 212 then transmits these packets to the router node 230 or group/subgroup of router nodes 230, in step S220. As before, the manager node 212 transfers the packets via the LAN to the encapsulator/injector 214. The encapsulator/injector 214 recovers the sequence of packets, formats them into transport stream packets and inserts them into the transport stream. Thus, the sequence of packets is transmitted by the forward path 203 to the remote sites 202.

In step S222, the manager node 212 increments a transmission counter to determine how many transmission of the same packet is sent. In step S224, the manager node 212 determines whether or not the sequence of packets has been transmitted a certain threshold number of times, by comparing the transmission counter to a transmission threshold. Illustratively, the transmission threshold is settable by the operator of the manager node 212.

If the manager node 212 has not yet transmitted the sequence of packets a threshold number of times, the manager node 212 returns to step S218, so as to repeat execution of steps S218–S224. This causes the sequence of packets to be transmitted again. If the manager node 212 has already transmitted the sequence of packets the threshold number of times, execution at the manager node 212 ends.

The net result is that the sequence of commands is transmitted multiple times. As stated, subsequently transmitted commands have identical version numbers to their previously transmitted counterparts. Thus, the router nodes 230 can determine whether each received command is new or a duplicate.

Although not shown in FIG. 8, the manager node 212 may now, at any time, generate and transmit command "global trigger" packets to each router node 230 in the selected group or subgroup in the same manner as steps S212 to S220.

At the reception sites 202, each router node 230 receives incoming packets. If the packets contain the multicast address assigned for SMMP in the IP header 162, the router node 230 identifies the SNMP protocol header 156 and examines the SMMP payload 158. Next, the router node 230 determines the type of the SNMP message. If the message is an SMMP command message, the router node 230 next determines if the session identifier in the field 166 corresponds to an active session for this router node 230 that has been previously enabled by the manager node 212. As described above, this would be true if the router node 230 was assigned to the same group or subgroup as the target group or subgroup as the SMMP message. If there is no match, the router node ignores/discards the packet. If there is a match, the router node 230 extracts the commands from the packet and places them in its queue.

If the command is a trigger command, the router node 230 executes the commands currently in its queue. In executing the commands, the router node 230 only executes one copy of each command. Thus, if there are commands with duplicate version numbers in the queue, only one of the commands will be executed. The commands are then discarded.

Further, in step S200, sets of other types of message packets may be defined as well, such as file download message packets. In the case of file download messages, a first message indicates various control information for the transfer, such as the total number of packets, the amount of storage required for the file, etc. Each file message packet also includes information indicating which specific numbered packet is transferred. Like command packets, file packets illustratively are transmitted multiple times to ensure their proper receipt. Furthermore, file packet transmission from the manager node 212 can also be delayed until a later operator specified time in a similar fashion as described above for command transmission. Unlike command packets, duplicate copies of file packets are not maintained. However, missing file packet information can be obtained in a subsequent transmission. Once all of the file information is received, the router node 230 transfers the file to its nonvolatile memory. This form of transfer can be used to send software upgrades or virtually any type of file to the router nodes 230.

Note too that the manager node 212 may optionally set a time delay to transmit the command message packets some time in the future. For example, suppose the operator desires to delay transmission of the command set until a specific future time. The operator of the manager node 212 can also specify the specific time at which the command set is to be executed. The manager node 212 responds by delaying execution of steps S218–S220 such time.

The other types of SMMP messages, i.e., control, keep-alive and auto-discover can also be transmitted from the manager node 212 multiple times to ensure that they are received. These commands can also be transmitted at an operator specified time, although it is usually desirable that keep-alive messages are transmitted according to a regular schedule and that auto-discover and control message be transmitted immediately. As noted above, SMMP control messages are transmitted to individual router nodes 230 for, among other things, opening sessions. Therefore, these messages do not include the multicast address for SMMP and instead include the IP and MAC address of the specific node to which they are destined. Note that the router nodes 230 only defer execution of the command type of messages until receiving the global trigger command.

It should be understood that the foregoing description is merely illustrative of the invention. Numerous alternative embodiments within the scope of the appended claims will be apparent to those of ordinary skill in the art.

The claimed invention is:

1. A method of managing one or more nodes comprising the steps of:
   (a) forming a packet comprising a network layer header, including a destination address for routing the packet to a destination, a second header identifying a syntax and semantic by which a payload of the packet may be parsed in a predefined fashion, and the payload containing a message to be executed by each of one or more to-be-managed nodes to which the packet is destined, and
   (b) transmitting the packet plural times to a plurality of nodes, including the one or more to-be-managed nodes, wherein the message in the particular packet is executed only a single time regardless of the number of times that a copy of the particular packet is received in the state enabling execution by the to-be-managed nodes of the message therein, and
   wherein the transmission of the particular packet plural times increases the likelihood that each of the to-be-managed nodes receives at least one copy of the particular packet in the state enabling execution of the message contained therein.

2. The method of claim 1 wherein said message is a command.

3. The method of claim 1 wherein said message is one of a command message, control message, file download message, auto discovery message, and keep-alive message.

4. The method of claim 2 further comprising the step of:
   (c) after transmitting the particular packet plural times transmitting a second packet at least once containing a command for causing one or more of the to-be-managed nodes to execute once a command previously received one or more times in one of the previously transmitted packets, regardless of the number of copies of the particular packet received in a state enabling execution by the to-be-managed nodes of the command therein.

5. The method of claim 4 wherein a to-be-managed node stores each copy of each command received in one or more of the particular packets, but executes only a single version of each command received regardless of the number of copies of the particular packet received in a state enabling execution by the to-be-managed nodes of the command therein.

6. The method of claim 5 further comprising the step of:
   (d) inserting into the particular packet information identifying a version of the command contained therein for purposes of enabling a to-be-managed node to identify duplicate copies of the command which need not be executed.

7. The method of claim 2 wherein the particular packet is inserted into a digital program signal containing variable length programs, so as not to disrupt the relative arrival timing of portions of the program signal.

8. The method of claim 2 wherein the particular packet is transmitted via a broadcast satellite network.

9. The method of claim 2 wherein step (b) transmits said packet plural time after a predetermined delay.

10. The method of claim 1 wherein each of the one or more to-be-managed nodes lacks a return path for acknowledging to a source of the particular packet that the particular packet has been received in a state enabling execution of the message contained therein.

11. A method for managing one or more nodes in a network comprising the steps of:
    (a) receiving one or more times a particular packet comprising a network layer header, including a destination address for routing the packet to a destination, a second header identifying a syntax and semantic by which a payload of the particular packet may be parsed in a predefined fashion, and the payload containing a message to be executed by each of one or more to-be-managed nodes to which the particular packet is destined,
    (b) if information in each received copy of the particular packet indicates that the particular packet is destined for a particular node, processing the particular packet, including, in response to detecting the second header, obtaining the message in the particular packet, if possible, and
    if at least one copy of the particular packet is received in a state enabling execution of the obtained message, executing the obtained message in the particular packet only a single time regardless of the number of times that the particular packet is received in the state enabling execution by the to-be-managed nodes of the obtained message therein,
    wherein the transmission of the particular packet plural times increases the likelihood that each of the to-be-managed nodes receives at least one copy of the particular packet in the state enabling execution by the to-be-managed nodes of the message contained therein.

12. The method of claim 11 wherein said message is a command.

13. The method of claim 11 wherein said message is one of a command message, control message, file download message, auto discovery message, and keep-alive message.

14. The method of claim 12 further comprising the step of:
    (c) after receiving the particular packet one or more times, receiving a second packet containing an execute command, and
    (d) executing once a command previously received one or more times in a respective previously transmitted copy of the particular packet, regardless of the number of copies of the particular packet received in a state enabling execution by the to-be-managed nodes of the command therein.

15. The method of claim 14 further comprising the step of:
    (e) storing each copy of each command received in a respective previously transmitted copy of the particular packet, but executing only one version of each stored command regardless of the number of copies of the particular packet received in a state enabling execution by the to-be-managed nodes of the command therein.

16. The method of claim 15 further comprising the step of:
    (f) while processing the stored commands, determining if multiple copies of the same command are stored in the particular node by referring to version information contained in the processed packet.

17. The method of claim 12 wherein the particular packet is extracted from a digital program signal containing variable length programs, the relative arrival timing of portions of the program signal being undisrupted by the presence of the particular packet therein.

18. The method of claim 12 wherein the particular packet is received via a broadcast satellite network.

19. The method of claim 1 wherein each of the one or more to-be-managed nodes lacks a return path for acknowledging to a source of the particular packet that the particular packet has been received in a state enabling execution of the message contained therein.

20. A packet for causing one or more to-be-managed nodes to robustly receive a to-be-executed message from a source in the absence of a return path from the to-be-managed nodes to the source comprising:
   (a) a network layer header, including a destination address designating that the packet is to be received by a group of nodes,
   (b) a second header, identifying the packet as being parseable according to a predefined syntax and semantic,
   (c) an identifier designating each of the to-be-managed nodes as recipients of the packet,
   (d) a message to be executed, and
   (e) version information, for preventing one of the to-be-managed nodes from executing the message more than one time.

21. The packet of claim 20 wherein said message is a command.

22. A sequence of plural packets for causing one or more to-be-managed nodes to robustly receive a to-be-executed message from a source in the absence of a return path from the to-be-managed nodes to the source comprising:
   (a) a first packet containing a message to be executed,
   (b) one or more second packets, each of which is identical to the first packet, and
   (c) a third packet following the first and second packets containing a message which initiates execution of the command by the to-be-managed node only once regardless of the number of times the message is received at a to-be-managed node.

23. The packets of claim 22 wherein said message is a command.

* * * * *

UNITED STATES PATENT AND TRADEMARK OFFICE
CERTIFICATE OF CORRECTION

PATENT NO.         : 7,058,054 B2                                                              Page 1 of 1
APPLICATION NO.    : 09/933265
DATED              : June 6, 2006
INVENTOR(S)        : Abdollahi et al.

It is certified that error appears in the above-identified patent and that said Letters Patent is hereby corrected as shown below:

On the Title Page, under "Notice", in Column 1, Line 3, delete "862" and insert -- 898 --, therefor.

In Column 1, Line 56, delete "6,148,182;" and insert -- 6,148,082; --, therefor.

In Column 20, Line 17, delete "SNMP" and insert -- SMMP --, therefor.

In Column 20, Line 19, delete "SNMP" and insert -- SMMP --, therefor.

Signed and Sealed this

Second Day of February, 2010

David J. Kappos
*Director of the United States Patent and Trademark Office*